April 3, 1945. A. P. McKAY Re. 22,627

AGRICULTURAL IMPLEMENT

Original Filed May 26, 1941 2 Sheets-Sheet 1

INVENTOR

Augusta P. McKay.

BY

Lancaster, Allwine & Rommel

ATTORNEYS

April 3, 1945. A. P. McKAY Re. 22,627

AGRICULTURAL IMPLEMENT

Original Filed May 26, 1941 2 Sheets-Sheet 2

INVENTOR
Augusta P. McKay.
BY
Lancaster, Allwine & Rommel
ATTORNEY

Reissued Apr. 3, 1945

Re. 22,627

UNITED STATES PATENT OFFICE 22,627

AGRICULTURAL IMPLEMENT

Augusta P. McKay, Cedartown, Ga., assignor to Rome Plow Company, Cedartown, Ga., a corporation Original No. 2,336,410, dated December 7, 1943, Serial No. 437,875, April 6, 1942, which is a division of Serial No. 395,258, May 26, 1941. Application for reissue July 10, 1944, Serial No. 544,194

11 Claims. (Cl. 97—50)

This invention relates to improvements in means for connecting and operating agricultural implements in connection with tractors.

The present application seeks reissue of a patent which matured from an application that was a division out of my prior application Serial No. 395,258, filed May 26, 1941.

The present invention relates to an improved agricultural implement, such as a harrow, which is particularly well adapted for connection to a light tractor, so that normally the implement will operate flexibly and freely upon the ground or material for which it is intended. The lifting mechanism of the improved implement is associated with the tractor so as to enable the implement to be entirely suspended upon the tractor, such as when it is desired to transport the implement or make a short turn with the tractor.

Other objects and advantages of this invention will be apparent during the course of the following detailed description.

In the drawings, wherein similar reference characters designate corresponding parts throughout the several views, Figure 1 is a side elevation of an implement, such as a suspension type of disc harrow operatively connected with a light duty type tractor.

Figure 3:
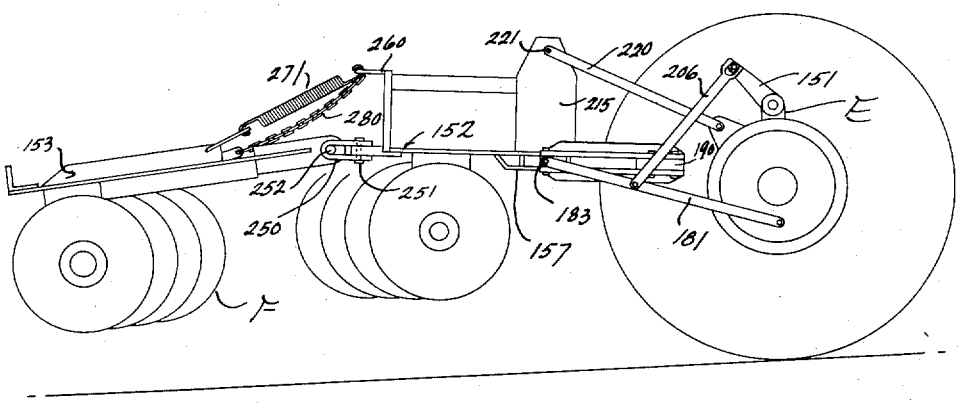
Fig. 3 is a view similar to Fig. 1, but with the power take-off and lift mechanism of the tractor operatively supporting the implement above a ground surface.
Figure 4:
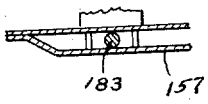
Fig. 4 is a cross-sectional view showing the association of the draft beam of the agricultural implement with a drawbar supported on the tractor.

In the drawings, wherein for the purpose of illustration is shown a preferred embodiment of the improved implement, the letter $A^1$ may designate the light duty type of tractor, or any other type if desired. It has associated therewith an auxiliary power unit or lift mechanism E and which may, for example, be of the form disclosed in some detail in H. G. Ferguson Patent No. 2,118,180, issued May 24, 1938. The agricultural implement F may be of the double cutting disc harrow type. It has associated therewith an improved hitch mechanism or draft connecting means applied to a conventional pair of power operated tension links pivoted on the tractor and indicated at G. Lifting mechanism H, also of conventional form, suspends the tension linkage G from the power lift mechanism E on the tractor $A^1$ and is utilized in lifting the implement F into a suspended position such as shown in Fig. 3. Improved means K is provided between the two sections of the harrow or implement F for operatively connecting the same for suspension purposes.

The power lift mechanism E is provided with a shaft 150 having lift arms 151 of well known construction.

Figure 1:
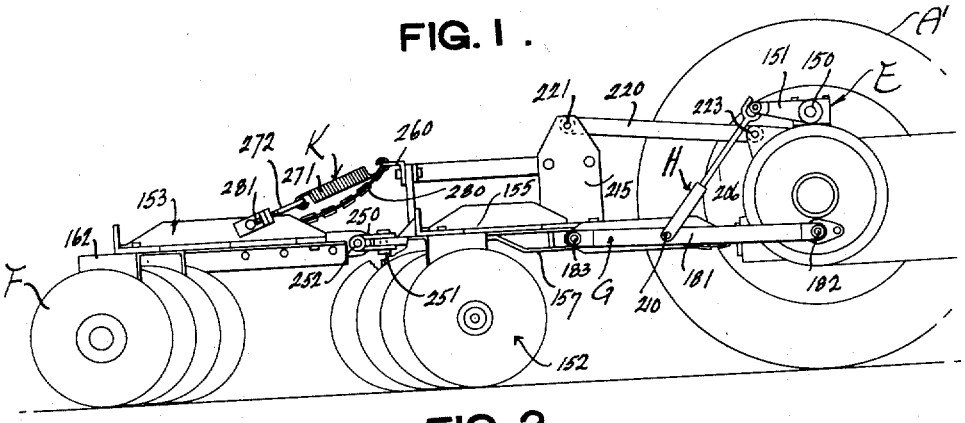

The implement F includes front and rear sections 152 and 153. The front section 152 is provided with disc supporting gangs 154 and 155 mounted upon a suitable frame 156. This front section also includes a central longitudinally extending draft beam 157 which at its fore portion is divided into upper and lower plates, as shown in Fig. 1. The draft beam 157 is relatively broad for a purpose to be subsequently described.

The rear section 153 includes a frame 160 having disc supporting gangs 161 and 162. The rear section also has a longitudinally extending draft beam 163, the forward end of which is connected by means of angle braces 165 with the frame 160. These angle braces extend rearwardly in divergent relation.

Referring to the improved draft connection applied to the linkage G, the latter includes the usual tension links 180 and 181 pivotally connected at points 182 at their forward ends to the axle housing of the tractor in the manner shown for the corresponding tension links in the Ferguson patent referred to above. They extend rearwardly, slightly divergent with respect to each other, and at their rear ends are provided with hitch structure including a transverse drawbar 183. This drawbar 183 between the points of connections of the links 180 and 181 is provided with rigidly attached angle pieces 185 and 186, in pairs, which extend convergently forward. At their front ends they rigidly support a pull plate 190. This pull plate 190 receives a vertically disposed coupling pin 191 to which the front end of the draft beam 157 of the implement F is pivotally attached. As before mentioned, the front end of the draft beam 157 is constructed of upper and lower plate sections. The drawbar 183 is disposed between these sections in a transverse sliding but otherwise snug non-tilting relation.

The lever arms 151 of the power lift mechanism E are provided with longitudinally adjustable lift bars 205 and 206, the same having a universal pivot connection with the levers 151 and at their lower ends being pivotally connected as at 210 with the tension links 180 and 181, intermediate the ends of the latter. It will be understood that raising of the levers 151 pulls the links 180 and 181 upwardly and lifts the implement F in a manner to be subsequently detailed.

The front section 152 of the implement F is provided with an upstanding member or standard 215, at the front end thereof, immediately above the drawbar 183, to which is pivotally connected a brace bar or compression link 220, at 221. The bar 220 is connected at 223 with the rear end of the tractor frame. These connections 221 and 223 are above the tension links 180 and 181 so that the front section of the harrow or implement F will be lifted in a horizontal plane when the lift mechanism E is operated.

Referring to the connections of the front and rear sections of the implement F, a coupling 250 is provided which has a vertical pivot axis connection at 251 with the rear end of the draft beam of the front section 152 and a horizontal axis connection at 252 with the front end of the draft beam of the rear section.

The means K includes a cross piece 260 upon the frame of the front section 152 at a location higher than any point of the rear section framework, and at each side of the longitudinal central axis of the implement springs 270 and 271 are connected with this cross piece 260. By means of adjustable bolts 272, these springs 270 and 271 are connected with the angle braces 162 at each side of the longitudinal axis of the implement. The springs 270 and 271 diverge rearwardly for the purpose of insuring proper alignment of the rear section as it is lifted into suspended position. I prefer also to provide a normally slack chain 280, located along the longitudinal center of the implement, connected at one end to the bar 260 and at the other end to a point 281 upon the framework of the rear section. This chain is very slack during operation of the implement and even when the implement is in suspended position. It only operates to prevent excessive vibration of the rear section and prevent rupture of the springs 270 and 271 should the strain upon the springs be too great because of passing of the tractor over irregular ground surfaces, etc.

The operation of the implement as it is drawn by the tractor will be apparent from the foregoing. The two sections of the implement F are entirely flexible and may move bodily upwardly or downwardly with respect to each other and tilt angularly with respect to each other, due to the universal type of coupling connection between them. The entire implement and especially the front section may pivotally move upwardly, downwardly and sideways with respect to the tractor. Since the pivot point at 191 for lateral swing of the draft beam is located closely adjacent the rear end of the tractor, the implement is closely coupled to the tractor, thereby minimizing the turning radius. The draft load is, however, transmitted from the draft beam 157, by compression through the supports 185 and 186, back to the drawbar 183 which is located rearwardly of the pivot point and adjacent the trailing ends of the links 180, 181.

As the lifting arms 151 pull the tension links 180 and 181 upwardly, it can readily be understood that this will lift the drawbar 183, and due to the action of the compressively loaded link 220 above described, the front section will be lifted in substantially a horizontal position. It will not tilt sidewise due to the close fitting connection of the upper and lower portions of the draft beam 157 upon the drawbar 183. In this connection, note that the draft beam 157 is very wide and will prevent this tilting of the front section.

Figure 2:
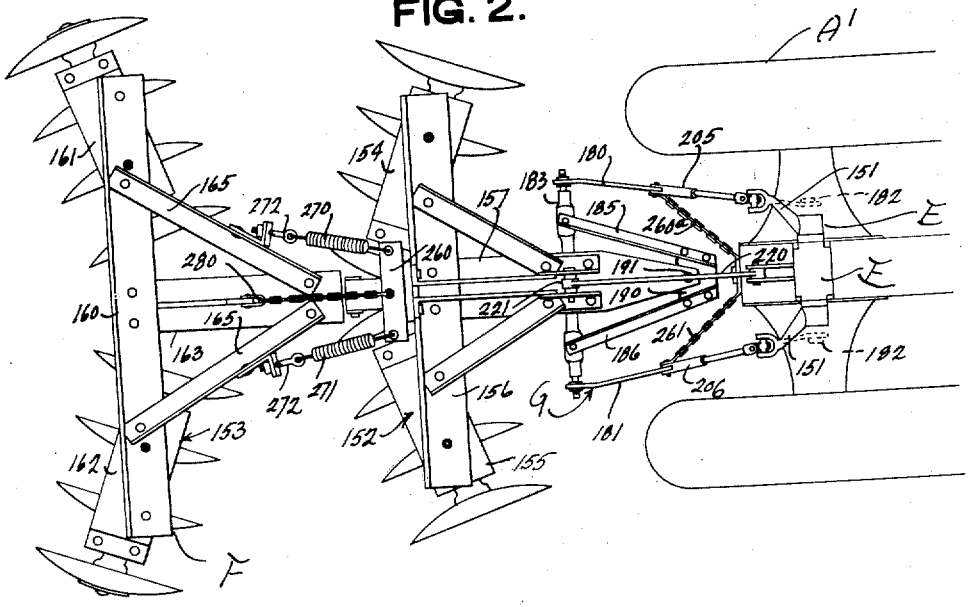
Fig. 2 is a plan view of the details of the implement and tractor of Fig. 1.

Flexible brace chains 260a and 261 may be connected to the rear end of the tractor frame and to the intermediate portions of the tension links 180 and 181, as shown in Fig. 2 of the drawings.

From the foregoing description of the invention it will be noted that an efficient type of draft connection has been provided for an agricultural or other implement to be drawn by the tractor which will enable the implement to operate with all of its flexibility and efficiency under normal circumstances. In addition, I have provided a mechanism which will enable the implement to be lifted or suspended clear of the ground, and to hold it in properly positioned and aligned relation. I am well aware that it has heretofore been proposed to lift implements at the rear of tractors by means of a variety of mechanisms, but none of them, so far as I am aware, will permit of the efficient and flexible operation of the implement, particularly such as are complicated, while still employing a mechanism of such structurally simple and rugged form as that which I provide while enabling the implement to be lifted and automatically swung into properly supported and aligned relation. The improved mechanism is particularly adaptable for use with multiple section disc harrows, since they are being more extensively used every day in cultivation and reclamation work, as well as in use of construction and highway projects.

Various changes in the shape, size and arrangement of parts may be made to the forms of invention herein shown and described, without departing from the spirit of the invention or the scope of the claims.

I claim:

1. In combination with a tractor, an auxiliary power unit, a pair of tension links connected with the tractor at each side of the longitudinal axis thereof and extending rearwardly therefrom in divergent relation, a transverse drawbar connected at the rear ends of said links, lift means connected with the power unit of the tractor and intermediate the ends of said links for lifting the latter upwardly and downwardly, and an implement having a slidable draft beam connection with said drawbar.

2. In an agricultural implement adapted to be drawn by a tractor, the combination of a front working section, a rear working section, means connecting said sections for flexible relative earth working movements, and means connected between said sections and free of direct connection with the tractor for vertically lifting and swinging the rearward section into proper position upon lifting of the forward section to a predetermined elevation.

3. In combination with a tractor, an auxiliary power unit for the tractor, a pair of tension links connected with the tractor one at each side of the longitudinal axis of the tractor and extending rearwardly divergently therefrom, a transverse drawbar connected at the rear ends of said tension links, means connected with the auxiliary power unit and intermediate the ends of said links for lifting the same, a pull arrangement connected with the drawbar and extending forwardly to a position between the drawbar and tractor, and an agricultural implement including a draft beam having connection with the forward part of said pull arrangement, the draft beam of said agricultural implement having a transverse slidable and non-tiltable connection upon said drawbar whereby upon elevation of the tension links the implement will be lifted with the drawbar into a suspended position.

4. In an agricultural implement the combination of a front working section, a rear working section, means positively connecting said sections for flexible relative earth working movement so that they may tilt from a horizontal plane angularly to each other and so that the rear section may swing laterally with respect to the front section, and springs connecting the front section with the rear section at each side of the longitudinal axes of the sections, and which in relation to each other extend divergently rearwardly to their points of connection with the rear section, the same being of such nature that an elevation of the front implement section will elevate and swing the rear implement section into alignment with the front section.

5. In an agricultural implement the combination of a front working section, a rear working section, means positively connecting said sections for flexible relative earth working movement so that they may tilt from a horizontal plane angularly with respect to the front section, a spring connecting the front section with the rear section at each side of the longitudinal axes of the sections and which springs in relation to each other extend divergently rearwardly to their points of connection with the rear section, the same being of such nature that an elevation of the front section will elevate and swing the rear section into alignment with the front section, and means to limit the degree of extension of said springs as the rear section is lifted by the front section when the latter is elevated.

6. In combination with a tractor, a front agricultural implement section having a drawbar connection with the tractor, a second and rear agricultural implement section flexibly connected upon positive pivot axes with the front section so that the second section can move with a vertical tilting action relative to the front section and with a horizontal lateral movement relative to the first section, means for directly lifting the first section off a ground surface from said tractor, and means connecting the front implement with the second section so that the second section will also be lifted at a predetermined elevation of the front section.

7. In combination with a tractor, an auxiliary power unit upon the tractor, a tension linkage connected with the tractor and extending rearwardly therefrom, means connecting the power unit with the linkage for lifting and lowering the rear end of the latter, an earth working implement, means for connecting the earth working implement in trailed relation with said linkage mechanism and for pivoting the earth working implement to swing laterally with respect to said linkage, and means including a brace directly connecting the implement with the tractor for effecting vertical lifting of the implement through the linkage, while maintaining the implement in substantially a horizontal position.

8. In a hitch mechanism for a tractor having a pair of laterally spaced tension links trailingly pivoted on its rear portion together with an auxiliary power unit on the tractor for swinging said links vertically about their pivots, the combination of a drawbar adapted to be secured transversely between the trailing ends of said links, a support rigid with said drawbar and projecting forwardly from it, an implement having a draft beam projecting forwardly, a pivotal connection between the forward end of said beam and the forward portion of said support for lateral swing of said draft beam about a pivot point located midway between said links and displaced sufficiently forwardly of the drawbar and adjacent the rear end of the tractor to afford a close coupling between the tractor and beam, and means connecting said beam and drawbar for slidable guiding of the beam by said drawbar in a horizontal direction upon lateral swinging of the beam about said pivotal connection.

9. In a hitch mechanism for a tractor having a pair of laterally spaced tension links trailingly pivoted on its rear portion together with an auxiliary power unit on the tractor for swinging said links vertically about their pivots, the combination of a drawbar adapted to be positioned generally transversely of the links adjacent their trailing ends, a support projecting forwardly of the center of the drawbar and rigidly fixed thereto to constitute therewith a unitary structure, means for attaching said unitary structure to said links with said structure located between said links and spanning the space between them, an implement having a forwardly projecting draft beam, and a pivotal connection between the forward end of said beam and said unitary structure for lateral swing of said beam about a pivot point located midway between said links and closely adjacent the rear end of the tractor, said draft beam being disposed with at least a portion thereof passing beneath said drawbar to limit the latter's downward movement upon descent of said links but said beam being freely slidable relative to the drawbar in a direction longitudinally of the latter to obviate any impediment to the beam's lateral swing about said pivot point.

10. In a hitch mechanism for a tractor having a pair of laterally spaced tension links trailingly pivoted on its rear end portion together with an auxiliary power unit on the tractor for swinging said links vertically, the combination of an implement having a forwardly projecting draft beam which is rigid from end to end, a transverse drawbar adapted to be secured to the trailing ends of said links, a support adapted to be positioned between said links forwardly of said drawbar and providing a pivot for the fore portion of said draft beam for lateral swinging movement of said beam about a point located closely adjacent the rear end of said tractor and forward of the trailing ends of said links to afford a close coupling between the tractor and implement and thereby minimize the turning radius therefor, and means connecting said beam and drawbar for slidable guiding of the beam by said drawbar in a horizontal direction upon lateral swinging of the beam about said pivot as well as for lifting of said rigid draft beam by said drawbar when the latter is elevated, to thereby effect raising of said beam and the implement attached thereto as an incident to upward swing of the tractor-borne links and the drawbar attached to the latter.

11. In a hitch mechanism for attaching a forwardly projecting implement draft beam which is rigid from end to end to a tractor having a pair of laterally spaced tension links trailingly pivoted on its rear end portion together with an auxiliary power unit on the tractor for swinging said links vertically, the combination of a hitch structure adapted to be positioned between said links and providing a pivot for the fore portion of said draft beam for lateral swinging movement of said beam about a point located closely adjacent the rear end of said tractor and forward of the trailing ends of said links to afford a close coupling between the tractor and implement and thereby minimize the turning radius of the implement, and means included in said hitch structure engageable with said draft beam at a point rearwardly of its pivoted fore portion for moving said draft beam and the implement connected therewith vertically in accordance with the vertical movements of said links.

AUGUSTA P. McKAY.